(12) United States Patent
Park et al.

(10) Patent No.: US 8,437,291 B2
(45) Date of Patent: May 7, 2013

(54) METHOD FOR CONFIGURING DIFFERENT DATA BLOCK FORMATS FOR DOWNLINK AND UPLINK

(75) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 571 days.

(21) Appl. No.: 12/382,745

(22) Filed: Mar. 23, 2009

(65) Prior Publication Data

US 2009/0238129 A1    Sep. 24, 2009

Related U.S. Application Data

(60) Provisional application No. 61/039,095, filed on Mar. 24, 2008.

(30) Foreign Application Priority Data

Mar. 16, 2009    (KR) ......................... 10-2009-0022076

(51) Int. Cl.
*H04W 4/00* (2009.01)
*H04J 3/24* (2006.01)

(52) U.S. Cl.
USPC .......................................... 370/329; 370/349

(58) Field of Classification Search .................... 370/329
See application file for complete search history.

(56) References Cited

U.S. PATENT DOCUMENTS

| | | | |
|---|---|---|---|
| 3,119,097 A | 1/1964 | Tullos | |
| 3,418,629 A | 12/1968 | Chien | |
| 3,439,279 A | 4/1969 | Guanella | |
| 6,028,854 A | 2/2000 | Raith et al. | |
| 7,218,619 B2 | 5/2007 | Koo et al. | |
| 7,801,081 B2 | 9/2010 | Choi et al. | |
| 2003/0016698 A1 | 1/2003 | Chang et al. | |
| 2003/0210676 A1 | 11/2003 | Wu | |
| 2005/0135318 A1 | 6/2005 | Walton et al. | |

(Continued)

FOREIGN PATENT DOCUMENTS

| CN | 1645786 | 7/2005 |
|---|---|---|
| CN | 1863407 | 11/2006 |

(Continued)

OTHER PUBLICATIONS

Nokia Corporation et al., "On Resource Release in Enhanced UL for CELL_FACH", 3GPP Draft, R2-080272, Jan. 7, 2008.
NEC, "Comparison of HS-based E-RACH resource assignment", 3GPP Draft; R2-080128, 3$^{rd}$ Generation Partnership Project (3GPP), Jan. 9, 2008.
LG Electronics, "Load Management of E-DCH resource Release", 3GPP TSG-RAN WG2 #61BIS, R2-081829, pp. 1-4, Mar. 31, 2008.
Ericsson, "Back-off operation for enhanced uplink in CELL_FACH", 3GPP Draft, R2-081502_EUL_BACK_OFF, 3$^{rd}$ Generation Partnership Project (3GPP), Mar. 25, 2008.

(Continued)

*Primary Examiner* — Derrick W. Ferris
*Assistant Examiner* — Noel Beharry
(74) *Attorney, Agent, or Firm* — McKenna Long & Aldridge LLP

(57) ABSTRACT

A method for establishing a radio bearer in a User Equipment (UE) in a mobile communication system is disclosed. The method includes receiving configuration information about a specific protocol layer, the configuration information indicating separate configuring of a downlink data block format and an uplink data block format for an entity of the specific protocol layer, wherein the entity of the specific protocol layer has both a transmitting side and a receiving side, and configuring the downlink data block format and the uplink data block format separately for the entity of the specific protocol layer according to the received configuration information.

7 Claims, 14 Drawing Sheets

U.S. PATENT DOCUMENTS

| | | | |
|---|---|---|---|
| 2005/0141436 | A1 | 6/2005 | Dick et al. |
| 2005/0221833 | A1 | 10/2005 | Granzow et al. |
| 2005/0287957 | A1 | 12/2005 | Lee et al. |
| 2006/0023629 | A1 | 2/2006 | Kim et al. |
| 2006/0251105 | A1 | 11/2006 | Kim et al. |
| 2006/0281417 | A1 | 12/2006 | Umesh et al. |
| 2007/0049309 | A1 | 3/2007 | Pan et al. |
| 2007/0140178 | A1 | 6/2007 | Jung et al. |
| 2007/0189236 | A1 | 8/2007 | Ranta-aho et al. |
| 2007/0206531 | A1 | 9/2007 | Pajukoski et al. |
| 2007/0242764 | A1 | 10/2007 | Anigstein et al. |
| 2007/0248060 | A1 | 10/2007 | Mooney et al. |
| 2007/0253447 | A1* | 11/2007 | Jiang .............................. 370/474 |
| 2007/0258402 | A1 | 11/2007 | Nakamata et al. |
| 2007/0288824 | A1 | 12/2007 | Yeo et al. |
| 2007/0291719 | A1 | 12/2007 | Demirhan et al. |
| 2008/0005638 | A1 | 1/2008 | Kuo et al. |
| 2008/0192674 | A1 | 8/2008 | Wang et al. |
| 2009/0041240 | A1 | 2/2009 | Parkvall et al. |
| 2009/0103500 | A1 | 4/2009 | Malkamaki et al. |
| 2009/0149189 | A1* | 6/2009 | Sammour et al. ............. 455/450 |
| 2009/0168731 | A1 | 7/2009 | Zhang et al. |
| 2009/0191883 | A1 | 7/2009 | Choi et al. |
| 2009/0245194 | A1 | 10/2009 | Damnjanovic et al. |
| 2009/0287976 | A1 | 11/2009 | Wang et al. |
| 2010/0067460 | A1 | 3/2010 | Hu et al. |
| 2010/0165953 | A1 | 7/2010 | Chen et al. |

FOREIGN PATENT DOCUMENTS

| | | |
|---|---|---|
| CN | 102067500 | 5/2011 |
| CN | 102150389 | 8/2011 |
| CN | 102160304 | 8/2011 |
| CN | 102160320 | 8/2011 |
| JP | 2006-087120 | 3/2006 |
| JP | 2006-191312 | 7/2006 |
| JP | 2007-531341 A | 11/2007 |
| JP | 2008-005492 A | 1/2008 |
| KR | 10-2001-0110188 | 12/2001 |
| KR | 10-0389818 | 12/2001 |
| KR | 10-2003-0043426 | 6/2003 |
| KR | 10-2005-0120189 | 12/2005 |
| KR | 10-2006-0067329 | 6/2006 |
| KR | 10-2006-0131808 | 12/2006 |
| KR | 10-2007-0026156 | 3/2007 |
| KR | 10-2007-0080544 | 8/2007 |
| KR | 10-2007-0121505 | 12/2007 |
| KR | 10-2008-0003682 | 1/2008 |
| KR | 10-2008-0018105 | 2/2008 |
| WO | WO 2005/125226 | 12/2005 |
| WO | WO 2006/104946 | 10/2006 |
| WO | WO 2007/023364 | 3/2007 |
| WO | WO 2007/052719 | 5/2007 |
| WO | WO 2007/091520 | 8/2007 |
| WO | WO 2007/109669 | 9/2007 |
| WO | WO 2007/121366 | 10/2007 |
| WO | WO 2007/148706 | 12/2007 |
| WO | WO 2009/020423 | 2/2009 |
| WO | WO 2009/045011 | 4/2009 |

OTHER PUBLICATIONS

LG Electronics Inc.: "PDCP SN size for UL and DL", 3GPP TSG-RAN WG2 #61bis, Mar. 31-Apr. 4, 2008, Shenzhen, China, R2-081586, XP50139318.

"Universal Mobile Telecommunications System (UMTS); Radio Link Control (RLC) protocol specification", 3GPP TS 25.322 version 7.3.0, Release 7, vol. 3-R2, No. V7.3.0, Jun. 1, 2007, XP014040005.

Persson, F., "Voice over IP Realized for the 3GPP Long Term Evolution", Vehicular Technology Conference, IEEE $66^{th}$, 2007, pp. 1436-1440.

3GPP TS 36.300 V8.4.0: $3^{rd}$ Generation Partnership Project; Technical Specification Group Radio Access Network: Evolved Universal Terrestrial Radio Access (E-UTRA) and Evolved Universal Terrestrial Radio Access Network (E-UTRAN); Overall description; Stage 2 (Release 8); Mar. 17, 2008.

3GPP TS 36.321, V8.0.0, Medium Access Control Protocol Specification, Dec. 1, 2007, pp. 1-23, XP002521635.

LG Electronics: "HARQ Feedback and Measurement Gap", 3GPP Draft, R2-081602 HARQ Feedback and Measurement Gap_RO, $3^{rd}$ Generation Partnership Project (3GPP), RAN WG2, Mar. 25, 2008.

NTT Docomo et al.: "UL HARQ handling when P-HICH collides with measurement gap", 3GPP Draft, R2-081727, $3^{rd}$ Generation Partnership Project (3GPP), RAN WG2, Mar. 25, 2008.

Ericsson: "E-UTRAN Random Access procedure C-RNTI assignment and HARQ on message 4 with RACH model" 3GPP Draft; R2-070365, 3rd Generation Partnership Project (3GPP), vol. RAN WG2, XP050133443, Jan. 2007.

Ericsson: 3GPP Draft; R1-080898, 3rd Generation Partnership Project (3GPP), vol. RAN WG1, XP050109373, Feb. 2008.

LG Electronics Inc: "Allocation of a "short" CRNTI in msg2" 3GPP Draft; R2-081038 Short CRNTI, 3rd Generation Partnership Project (3GPP), vol. RAN WG2, XP050138828, Feb. 2008.

Nokia Siemens Networks et al: "Way Forward on Scrambling Sequence Initialisation", 3GPP Draft; R1-081128_SCRAMBLING, 3rd Generation Partnership Project (3GPP), vol. RAN WG1, XP050109572, Feb. 2008.

LG Electronics Inc., "Scrambling of Message 3", 3GPP Draft; R2-082508, 3rd Generation Partnership Project(3GPP), vol. RAN WG2, XP050140189, May 2008.

Ericsson et al. "Control of semi persistent scheduling", TSG-RAN WG2 meeting #61, Sorrento, Italy, Feb. 11-15, 2008, R2-080765.

Nokia Corporation et al. "Persistent scheduling for DL", 3GPP TSG-RAN WG2 Meeting #60bis, Sevilla, Spain, Janury 14-18, 2008, R2-080018.

Panasonic, "UL HARQ behavior with dynamic adaptive/non-adaptive operation", 3GPP TSG-RAN WG2 Meeting #60, Jeju, Korea, Nov. 5-9, 2007, R2-074854.

Nokia et al., "Measurement gaps way forward", 3GPP TSG-RAN WG2 Meeting #60, Jeju, Korea, Nov. 5-9, 2007, R2-075429.

Panasonic, "PDCCH/PHICH interaction—detailed UE behavior", 3GPP TSG RAN WG2 #61, Feb. 11-15, 2008, Sorrento, Italy, R2-080876.

\* cited by examiner (a) Control - plane protocol stack (b) User - plane protocol stack Model of PDCP entity of the PDCP protocol layer (a) PDCP Data PDU with 7bit SN (b) PDCP Data PDU with 15bit SN Overview model of the RLC protocol layer Model of two unacknowledged mode peer entities of
the RLC protocol layer (a) UMD PDU with 5 bit SN (No LI)

(b) UMD PDU with 10 bit SN (No LI)

Model of acknowledged mode entity of
the RLC protocol layer

AMD PDU (No LI)

US 8,437,291 B2

METHOD FOR CONFIGURING DIFFERENT DATA BLOCK FORMATS FOR DOWNLINK AND UPLINK

This application claims the benefit of U.S. Provisional Application No. 61/039,095, filed on Mar. 24, 2008 and Korean Patent Application No. 10-2009-0022076, filed on Mar. 16, 2009, both of which are hereby incorporated by reference as if fully set forth herein.

BACKGROUND OF THE INVENTION

1. Field of the Invention

The present invention relates to a mobile communication system, and more particularly, to a method for establishing a radio bearer in a mobile communication system.

2. Discussion of the Related Art $3^{rd}$ Generation Partnership Project (3GPP) wireless communication systems based on Wideband Code Division Multiple Access (WCDMA) radio access technology have been deployed all over the world. High Speed Downlink Packet Access (HSDPA), the first evolution of WCDMA provides the 3GPP with a radio access technology that is highly competitive in a mid-term perspective. Evolved Universal Mobile Telecommunications System (E-UMTS) aims at high competitiveness in a long-term perspective.

FIG. 1 illustrates a network configuration of the E-UMTS. The E-UMTS system is an evolved version of the conventional WCDMA UMTS system and its basic standardization is in progress under the 3GPP. E-UMTS is also called Long Term Evolution (LTE). For details of the technical specifications of UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), a base station (or eNB or eNode B), and an Access Gateway (AG) which is located at an end of network (E-UTRAN) and which is connected to an external network. Generally, an eNB can simultaneously transmit multiple data steams for a broadcast service, a multicast service and/or a unicast service. The AG can be divided into a part that handles processing of user traffic and a part that handles processing of control traffic. Here, the AG part for processing new user traffic and the AG part for processing control traffic can communicate with each other using a new interface. One or more cells may exist for one eNB. An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of the UE on a Tracking Area (TA) basis. One TA includes a plurality of cells. When the UE has moved from a specific TA to another TA, the UE notifies the AG that the TA where the UE is located has been changed.

FIG. 2 illustrates a network configuration of an Evolved Universal Terrestrial Radio Access Network (E-UTRAN) system. The E-UTRAN system is an evolved version of the conventional UTRAN system. The E-UTRAN includes a base station that will also be referred to as "eNode B" or "eNB". eNBs are connected through an X2 interface. Each eNB is connected to the UE through a radio interface and is connected to an Evolved Packet Core (EPC) through an S1 interface.

To conduct communications in a mobile communication system, a UE and an eNB should configure data block formats for data transmission and reception. Conventionally, data block formats are configured without taking into account characteristics of downlink and uplink traffics, thus resulting in dissipation of radio resources.

SUMMARY OF THE INVENTION

Accordingly, the object of the present invention is to provide a method of for efficiently using radio resources when downlink traffic and uplink traffic are asymmetrical in their characteristics in a wireless communication system that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for establishing a radio bearer in a User Equipment (UE) in a mobile communication system includes receiving configuration information about a specific protocol layer, the configuration information indicating separate configuring of a downlink data block format and an uplink data block format for an entity of the specific protocol layer, wherein the entity of the specific protocol layer has both a transmitting side and a receiving side in the specific protocol layer, and configuring the downlink data block format and the uplink data block format separately for the entity of the specific protocol layer according to the received configuration information.

The method may further include transmitting and receiving data using downlink and uplink data block formats configured for the entity of the specific protocol layer.

The entity having both the transmitting side and the receiving side in the specific protocol layer may include at least one of a Packet Data Convergence Protocol (PDCP) entity and a Acknowledged Mode Radio Link Control (AM RLC) entity.

The configuration information may indicate the downlink data block format and the uplink data block format separately according to traffic characteristics. The configuration information may indicate configuring of the downlink and uplink data block formats to be different. The configuration information may indicate the downlink and uplink data block formats by sizes of Sequences Numbers (SNs) included in data blocks. The configuration information may indicate the downlink and uplink data block formats by an index indicating a combination of the downlink and uplink data block formats.

The configuration information may be about a bi-directional Data Radio bearer (DRB). The bi-directional DRB may have different downlink and uplink traffic characteristics. The bi-directional DRB may use a downlink Unacknowledged Mode Radio Link Control (UM RLC) entity and an uplink UM RLC entity, and the downlink UM RLC entity and the uplink UM RLC entity may use different UM RLC data block formats. A UM RLC data block format used by the downlink UM RLC entity may include a 10-bit SN and a UM RLC data block format used by the uplink UM RLC entity may include a 5-bit SN.

The entity of the specific protocol layer may be a PDCP entity and the downlink and uplink PDCP data block formats may be different for the PDCP entity. The downlink PDCP data block format may use a 12-bit SN and the uplink PDCP data block format may use a 7-bit SN.

A data block used by the entity of the specific protocol may include a Protocol Data Unit (PDU).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Herein, downlink transmission refers to transmission of data from an eNB to a UE and uplink transmission refers to transmission of data from a UE to an eNB.

Figure 1:
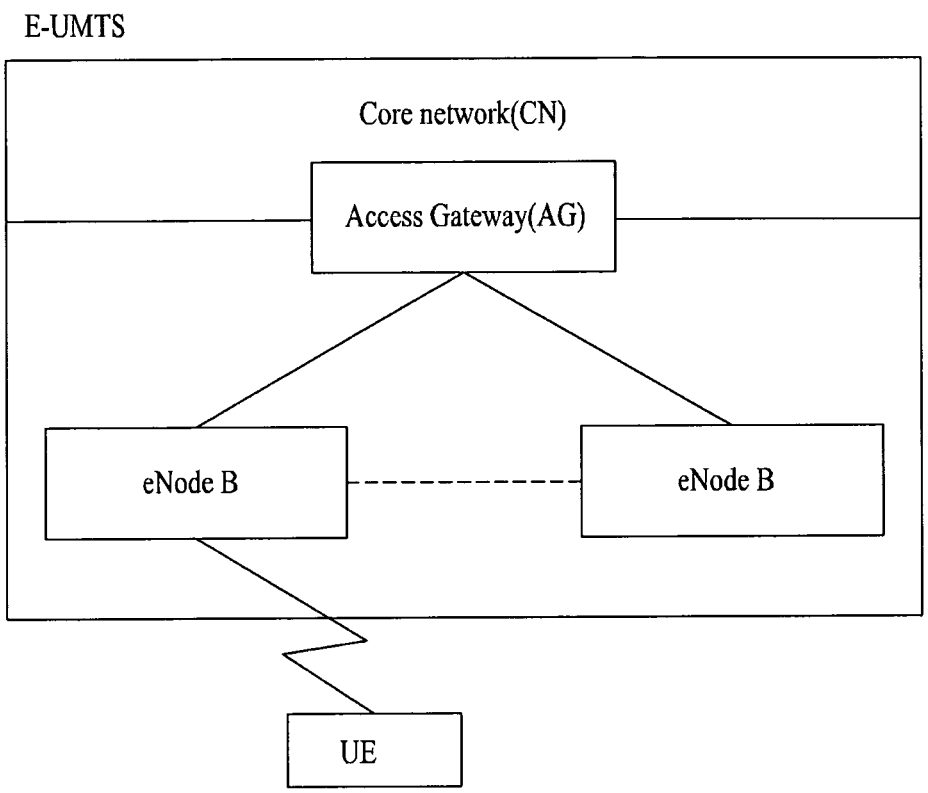
FIG. 1 illustrates the network configuration of an E-UMTS system.
Figure 2:
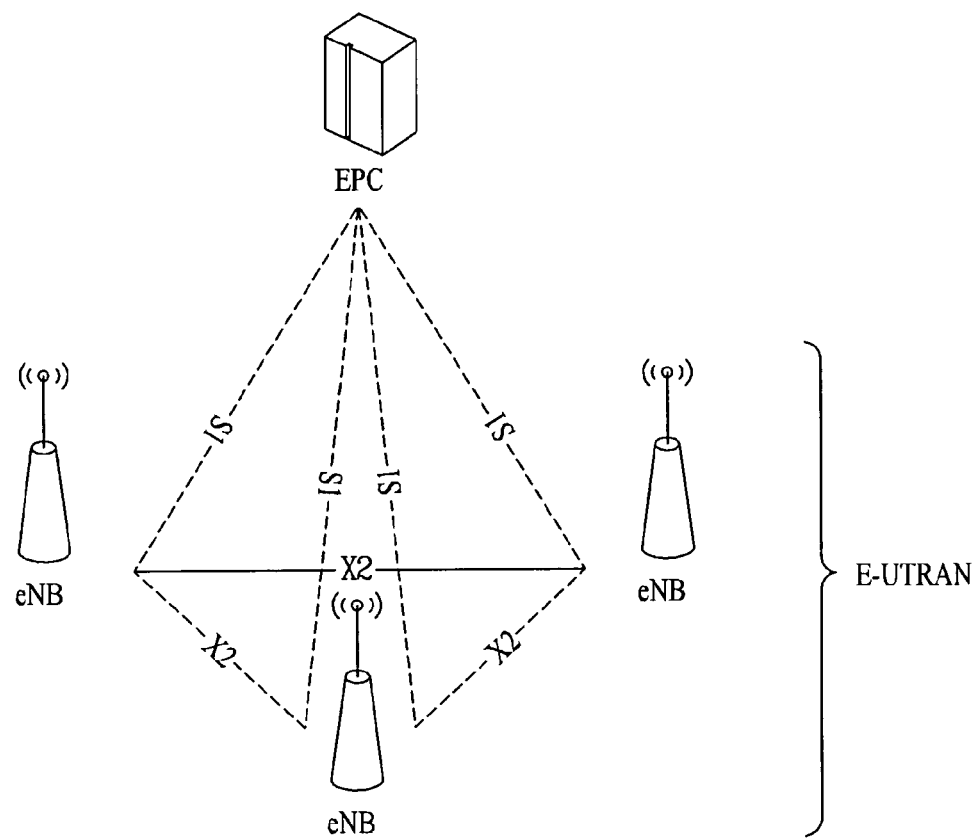
FIG. 2 illustrates the configuration of an E-UTRAN.
Figure 3:
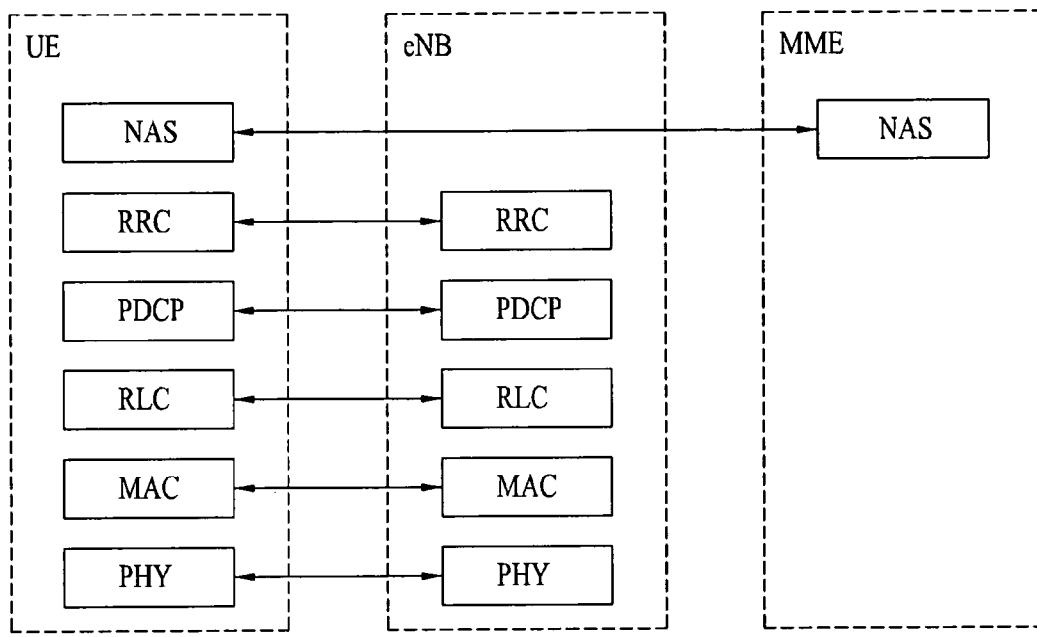
FIGS. 3(a) and 3(b) illustrate the configurations of a control plane and a user plane in radio interface protocols between a UE and an E-UTRAN.
Figure 3:
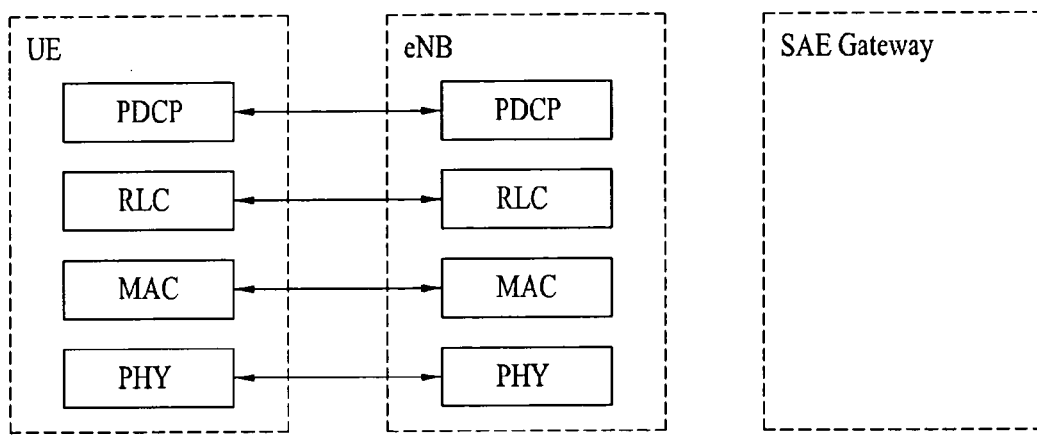

FIGS. 3(a) and 3(b) respectively illustrate the configurations of a control plane and a user plane in radio interface protocols between a UE and a UMTS Terrestrial Radio Access Network (UTRAN) based on the 3$^{rd}$ Generation Partnership Project (3GPP) radio access network standard. The radio interface protocols are divided horizontally into a physical (PHY) layer, a data link layer, and a network layer, and vertically into a user plane for data transmission and a control plane for signaling. The protocol layers of FIGS. 3(a) and 3(b) can be divided into Layer 1 (L1), Layer 2 (L2), and Layer 3 (L3) based on the lower three layers of the Open System Interconnection (OSI) reference model widely known in communication systems.

The control plane is a passage through which control messages that a UE and a network use in order to manage calls are transmitted. The user plane is a passage through which data (e.g. voice data or Internet packet data) generates at an application layer is transmitted. The following is a detailed description of the layers of the control and user planes in the radio interface protocols.

The PHY layer or L1 provides an information transfer service to an upper layer on a physical channel. The PHY layer is connected to a Media Access Control (MAC) layer above the PHY layer through a transport channel. Data is transferred between the MAC layer and the PHY layer on the transport channel. Transport channels are classified into dedicated transport channels and common transport channels depending on whether they are shared or not. Data transfer between different PHY layers, specifically between the PHY layers of a transmitting side and a receiving side is carried out on a physical channel. The physical channel is modulated in Orthogonal Frequency Division Multiplexing (OFDM), using time and frequencies as radio resources.

The MAC layer of L2 maps a plurality of logical channels to a plurality of transport channels. The MAC layer also maps a plurality of logical channels to one transport channel by logical channel multiplexing. The MAC layer is connected to an upper layer called a Radio Link Control (RLC) layer through a logical channel. Logical channels are classified according to the types of information that they carry, specifically into control channels carrying control-plane information and traffic channels carrying user-plane information.

The RLC layer of L2 adjusts the size of data received from an upper layer by segmentation and concatenation such that its lower layers can transmit data over a radio interface. In order to ensure various Quality of Service (QoS) requirements for Radio Bearers (RBs), the RLC layer supports the following three operation modes: Transparent Mode (TM), Unacknowledged Mode (UM), and Acknowledged Mode (AM). Especially RLC AM supports retransmission by Automatic Repeat reQuest (ARQ), for reliable data transmission.

A Packet Data Convergence Protocol (PDCP) layer of L2 reduces the size of the header of an Internet Protocol (IP) packet carrying a relatively large amount of unnecessary control information by header compression in order to efficiently use a radio interface with a relatively narrow bandwidth during transmission of IP packets such as IP version 4 (IPv4) or IP version 6 (IPv6) packets. The header compression enables transmission of only necessary information in the packet header of data, thereby increasing the transmission efficiency of the radio interface. The PDCP layer also takes charge of a security function in the LTE system. The security function involves ciphering for preventing a third party's unauthorized access to data and integrity protection for protecting data from unauthorized alteration of a third party.

A Radio Resource Control (RRC) layer at the bottom of L3 is defined only in the control plane. The RRC layer is responsible for controlling logical channels, transport channels, and physical channels in association with configuration, re-configuration, and release of RBs. To accomplish this, the RRC layers of the UE and the network exchange RRC messages. If an RRC connection has been established between the RRC layers of the radio network and the UE, the UE is in RRC connected mode. Otherwise, the UE is in RRC idle mode.

An RB is a service or a logical path that L2 provides for data transmission between the UE and the UTRAN. In general, an RB setup is a process of defining radio protocol layers and channel characteristics that are required to provide a specific service and specifying parameters and an operation method. There are two types of RBs, Signaling RB (SRB) and Data RB (DRB). The SRB is used as a path through which an RRC message is transmitted in the control plane, while the DRB serves as a path through which user data is transmitted in the user plane.

A Non-Access Stratum (NAS) layer above the RRC layer performs functions such as session management and mobility management.

A cell of the eNB is set to use a bandwidth of 1.25, 2.5, 5, 10 or 20 MHz in order to provide a downlink or uplink transmission service to UEs. Here, different cells may be set to use different bandwidths.

Downlink transport channels carrying data from the network to the UE include a Broadcast CHannel (BCH) for transmission of system information, a Paging CHannel (PCH) for transmission of paging messages, and a downlink Shared CHannel (SCH) for transmission of user traffic or control messages. User traffic or control messages of a downlink multicast or broadcast service may be transmitted on a downlink SCH or on a downlink Multicast CHannel (MCH). Uplink transport channels for transmission of data from the UE to the network include a Random Access CHannel (RACH) for transmission of initial control messages and an uplink SCH for transmission of user traffic or control messages.

Logical channels, which are located above the transport channels and are mapped onto the transport channels, include a Broadcast Control CHannel (BCCH), a Paging Control CHannel (PCCH), a Common Control CHannel (CCCH), a Multicast Control CHannel (MCCH) and a Multicast Traffic CHannel (MTCH).

Figure 4:
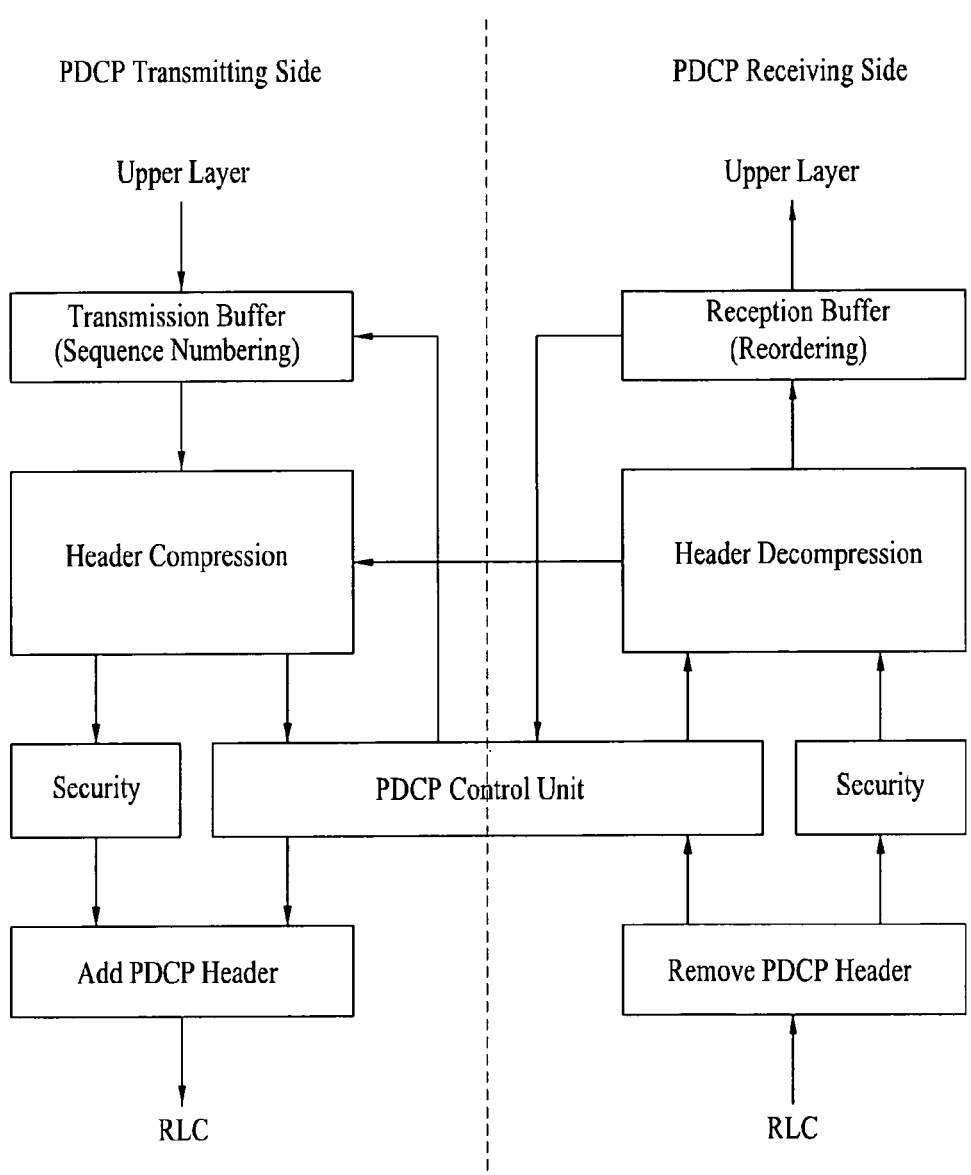
FIG. 4 is a functional block diagram of a Packet Data Convergence Protocol (PDCP) entity in a PDCP protocol.

FIG. 4 is a functional block diagram of the PDCP layer. The blocks illustrated in FIG. 4 are functional blocks, which may be different in real implementation. The PDCP layer is connected to the RRC layer or a user application as its upper layer and the RLC layer as its lower layer. The functions of the PDCP layer are carried out in PDCP entities. A PDCP entity includes a transmitting side (PDCP transmitting side) and a receiving side (PDCP receiving side). The PDCP transmitting side configures a Protocol Data Unit (PDU) with a Service Data Unit (SDU) received from the upper layer or with autonomously created control information and transmits the PDU to the receiving side of a peer PDCP entity. The PDCP receiving side extracts a PDCP SDU or control information from a PDCP PDU received from the transmitting side of the peer PDCP entity. The PDCP transmitting and receiving sides process data as follows.

PDCP Transmitting Side

Step 1: The PDCP transmitting side receives PDCP SDUs, buffers them in a transmission buffer, and allocates Sequence Numbers (SNs) to the respective PDCP SDUs.

Step 2: If an RB has been established in the user plane, i.e. DRB, the PDCP transmitting side performs header compression on a PDCP SDU.

Step 3: If the RB has been established in the control plane, i.e. SRB, the PDCP transmitting side performs an integrity protection operation for the PDCP SDU.

Step 4: The PDCP transmitting side encrypts the data block resulting from Step 2 or Step 3.

Step 5: After generating a PDCP PDU by attaching an appropriate header to the encrypted data block, the PDCP transmitting side transfers the PDCP PDU to the RLC layer.

—PDCP Receiving Side

Step 1: The PDCP receiving side removes a header from a received PDCP PDU.

Step 2: The PDCP receiving side decrypts the header-free PDCP PDU.

Step 3: If an RB has been established in the user plane, i.e. DRB, the PDCP receiving side performs header decompression for the decrypted PDCP PDU.

Step 4: If the RB has been established in the control plane, i.e. SRB, the PDCP receiving side verifies the integrity of the decrypted PDCP PDU.

Step 5: The PDCP receiving side transfers the data block resulting from Step 3 or Step 4 (i.e. a PDCP SDU) to the upper layer. If the DRB has been established, the PDCP receiving side buffers the PDCP SDU in a reception buffer, re-orders the PDCP SDU, and then transmits the re-ordered PDCP SDU to the upper layer, when needed.

There are two types of PDUs that the PDCP transmitting side generates, data PDU and control PDU. The PDCP data PDU is a data block that the PDCP transmitting side creates by processing an SDU received from the upper layer, whereas the PDCP control PDU is a data block that the PDCP transmitting side autonomously generates to transmit control information to a peer entity.

PDCP data PDUs are generated in both a DRB and an SRB. Some PDCP functions are selectively performed depending on a used plane. That is, header compression is carried out only for user-plane data, whereas integrity protection as part of a security function applies only to control-plane data. Aside from integrity protection, the security function includes ciphering for maintaining data security. Ciphering applies to both user-plane and control-plane data. The PDCP control PDU is generated only in the DRB. Two types of PDCP control PDUs are defined, namely a PDCP status report indicating the status of a PDCP reception buffer to the PDCP transmitting side and a Header Compression (HC) feedback packet indicating the status of a header decompressor to a header compressor.

The PDCP data PDU has a different configuration depending on whether it delivers control information of the control plane or user data of the user plane. Herein, user-plane PDCP data PDU will be described as a representative example of the PDCP data PDU.

Figure 5:
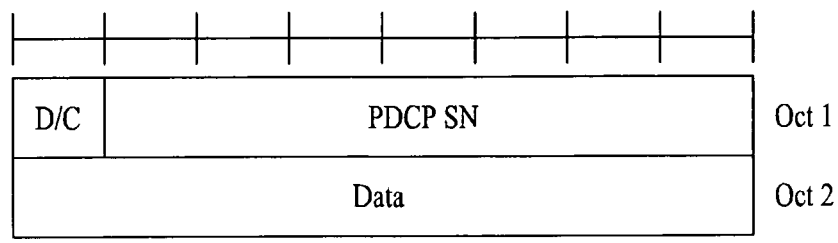
FIGS. 5(a) and 5(b) illustrate data block formats for the PDCP entity.
Figure 5:
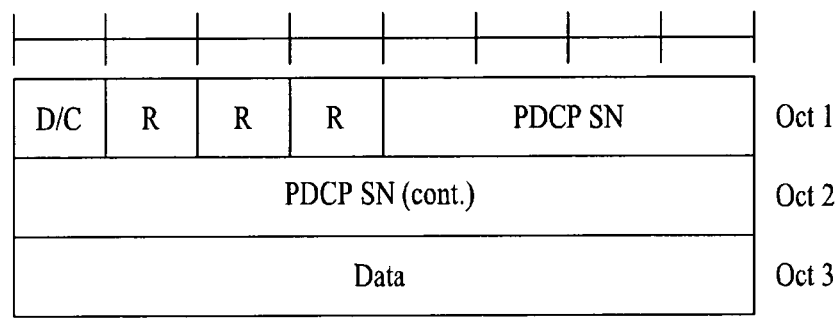

FIGS. 5(a) and 5(b) illustrate exemplary data block formats for the PDCP entity. While the data block formats are for a user-plane PDCP data PDU for the convenience' sake, they are mere exemplary applications and thus it is to be clearly understood that other various data block formats are available. There are two types of user-plane PDCP data PDUs according to traffic characteristics of DRBs.

FIG. 5(a) illustrates the structure of a PDCP data PDU with a 7-bit PDCP SN. This short PDCP-SN PDU with the 7-bit PDCP SN is used only in a DRB using RLC UM for the purpose of effectively supporting Voice over IP (VoIP) service that uses mainly RLC UM. A VoIP packet uses short PDCP-SN PDUs to shorten its header from 2 bytes to 1 byte because it has a very short payload of tens of bytes.

FIG. 5(b) illustrates the structure of a PDCP data PDU with a 12-bit PDCP SN. This long PDCP-SN PDU with the 12-bit PDCP SN is used mainly for a DRB that uses RLC AM characteristic of high-rate transmission and payload longer than a header. A DRB using RLC UM uses a long PDCP-SN PDU, if it has similar characteristics to the RLC-AM DRB.

The header of the PDCP data PDU includes the following fields.

D/C (Data/Control): 1 bit. This field indicates whether the PDCP PDU is a data PDU or a control PDU.

R (Reserved): 1 bit. R is added for byte-alignment of the header fields.

SN: 7 bits or 12 bits. SN is a sequence number identifying the PDCP PDU.

Figure 6:
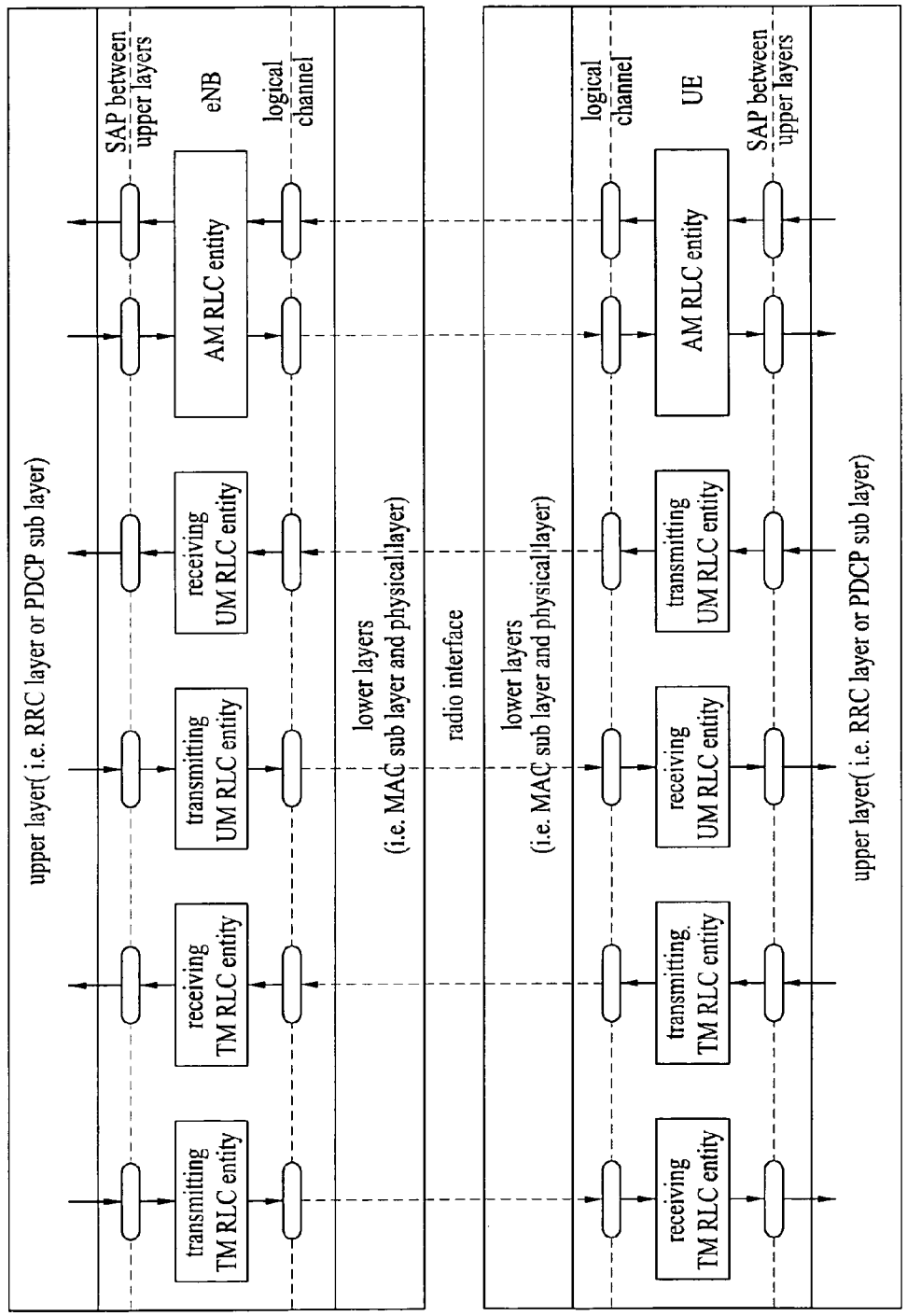
FIG. 6 is an overall functional block diagram of a Radio Link Control (RLC) layer.

FIG. 6 is an overall functional block diagram of the RLC layer. The blocks illustrated in FIG. 6 are functional blocks, which may be different in real implementation. An RLC setup is commanded by the RRC layer. The functions of the RLC layer are performed in RLC entities. For an RLC entity established in an eNB (or a UE), a peer RLC entity is established in the UE (or the eNB). The RLC entity transmits/receives an RLC SDU to/from an upper layer and transmits/receives an RLC PDU to/from the peer RLC entity through lower layers.

A TM RLC entity is configured either as a transmitting TM RLC entity or a receiving TM RLC entity. The transmitting TM RLC entity receives an RLC SDU from the upper layer and transmits an RLC PDU to its peer receiving TM RLC entity. The receiving TM RLC entity receives an RLC PDU from its peer transmitting TM RLC entity and transmits an RLC SDU to the upper layer.

A UM RLC entity is configured either as a transmitting UM RLC entity or as a receiving UM RLC entity. The transmitting UM RLC entity receives an RLC SDU from the upper layer and transmits an RLC PDU to its peer receiving UM RLC entity. The receiving UM RLC entity receives an RLC PDU from its peer transmitting UM RLC entity and transmits an RLC SDU to the upper layer.

An AM RLC entity includes a transmitting side (AM RLC transmitting side) and a receiving side (AM RLC receiving side). The AM RLC transmitting side receives an RLC SDU from the upper layer and transmits an RLC PDU to the receiving side of a peer AM RLC entity. The AM RLC receiving side receives an RLC PDU from the transmitting side of the peer AM RLC entity and transmits an RLC SDU to the upper layer.

Figure 7:
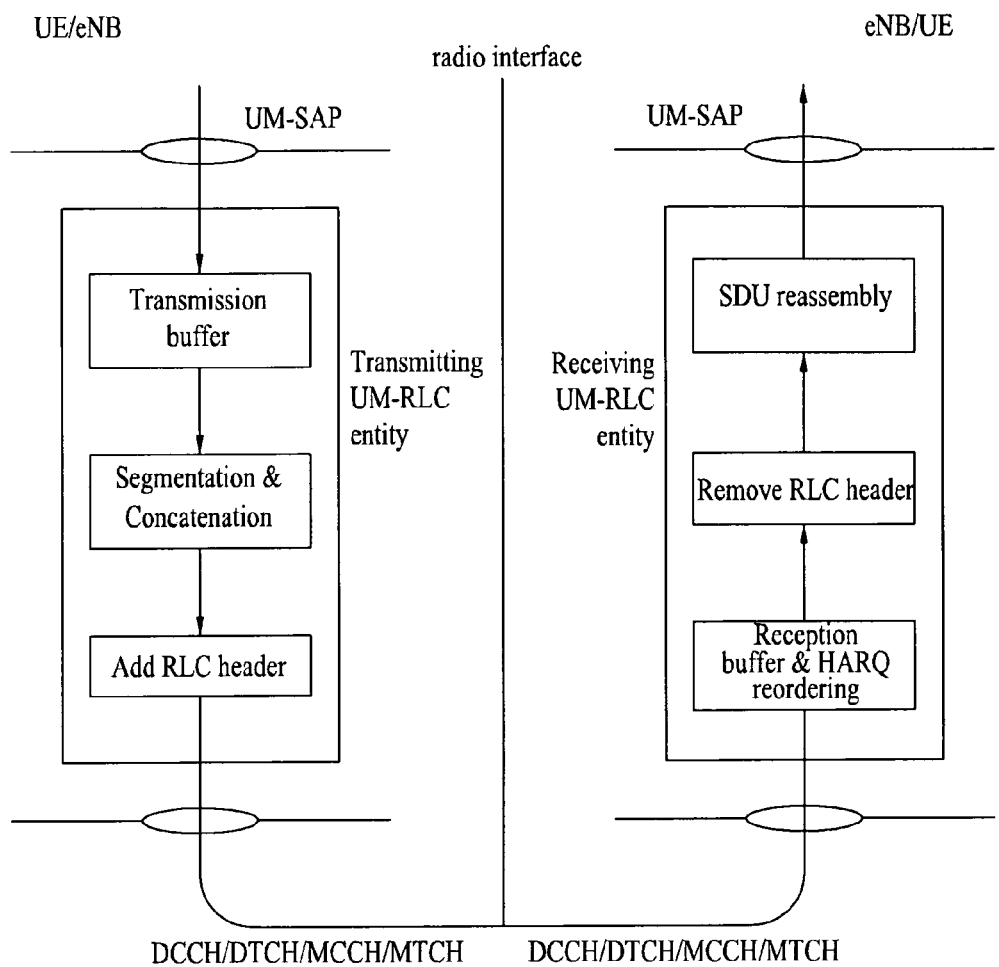
FIG. 7 is a functional block diagram of an Unacknowledged Mode RLC (UM RLC) entity in the RLC layer.

FIG. 7 is a functional block diagram of the UM RLC entity in the RLC layer. The blocks illustrated in FIG. 7 are functional blocks, which may be different in real implementation. A transmitting/receiving UM RLC entity processes data as follows.

Transmitting UM RLC Entity

Step 1: The transmitting UM RLC entity receives an RLC SDU(s) from the upper layer, namely the PDCP layer and buffers the RLC SDU(s) in a buffer.

Step 2: Upon request of transmission from the lower layer, i.e. the MAC layer, every predetermined transmission time, the transmitting UM RLC entity segments and/or concatenates as many RLC SDUs as needed according to a requested data size.

Step 3: The transmitting UM RLC entity configures an RLC PDU by adding an RLC SN to the segmented and/or concatenated data block.

Receiving UM RLC Entity

Step 1: The receiving UM RLC entity buffers an Unacknowledged Mode PDU(s) (UMD PDU(s)) and removes a redundant UMD PDU(s). If the UMD PDU(s) are out of sequence, the receiving UM RLC entity re-orders the UMD PDU(s) in an original order.

Step 2: The receiving UM RLC entity removes an RLC header from a UMD PDU.

Step 3: The receiving UM RLC entity re-assembles an RLC SDU(s) with the re-ordered UMD PDU(s) and sequentially transmits the RLC SDU(s) to the upper layer.

Figure 8:
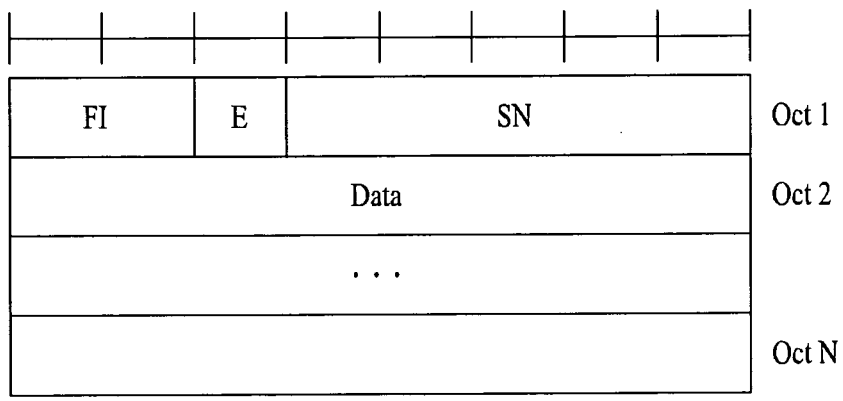
FIGS. 8(a) and 8(b) illustrate data block formats for the UM RLC entity.
Figure 8:
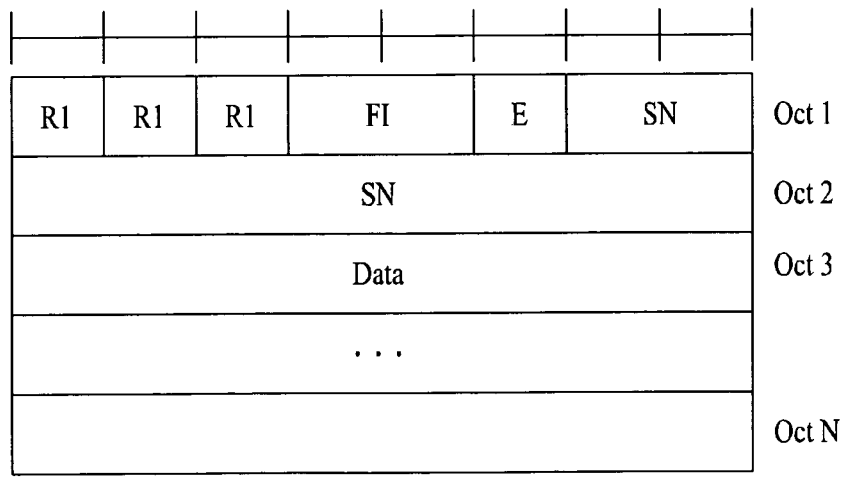

FIGS. 8(*a*) and 8(*b*) illustrate exemplary data block formats for the UM RLC entity. The data block formats are examples and thus many other data block formats are available for the UM RLC entity. A UMD PDU is composed of a data field and a UMD PDU header. The UMD header is divided into a fixed part and an extension part. The fixed part is byte-aligned, including an FI, an E, and an SN. The extension part, which is byte-aligned, includes an E (Es) and an LI (LIs).

The UM RLC entity can be configured to have a 5-bit SN or a 10-bit SN by the RRC layer. FIGS. 8(*a*) and 8(*b*) illustrate a UMD PDU with a 5-bit SN and a UMD PDU with a 10-bit SN, respectively. In case of a 5-bit SN, the fixed part of the UMD PDU header is 1 byte, and in case of a 10-bit SN, it is 2 bytes. Only if two or more data field elements are included in the UMD PDU, the UMD PDU header has an extension field. In this case, an E and an LI exist for every data field except for the last data field.

The fields of the UMD PDU header are described below.

FI (Framing Info): 2 bits. FI indicates whether the start and/or end of a data field correspond to the start and/or end of an RLC SDU.

E (Extension): 1 bit. E indicates the presence of a data field or an E/FI field.

R1 (Reserved): 1 bit. R1 is added for byte-alignment of the header fields.

SN: 5 or 10 bits. SN is a sequence number identifying the UMD PDU.

Figure 9:
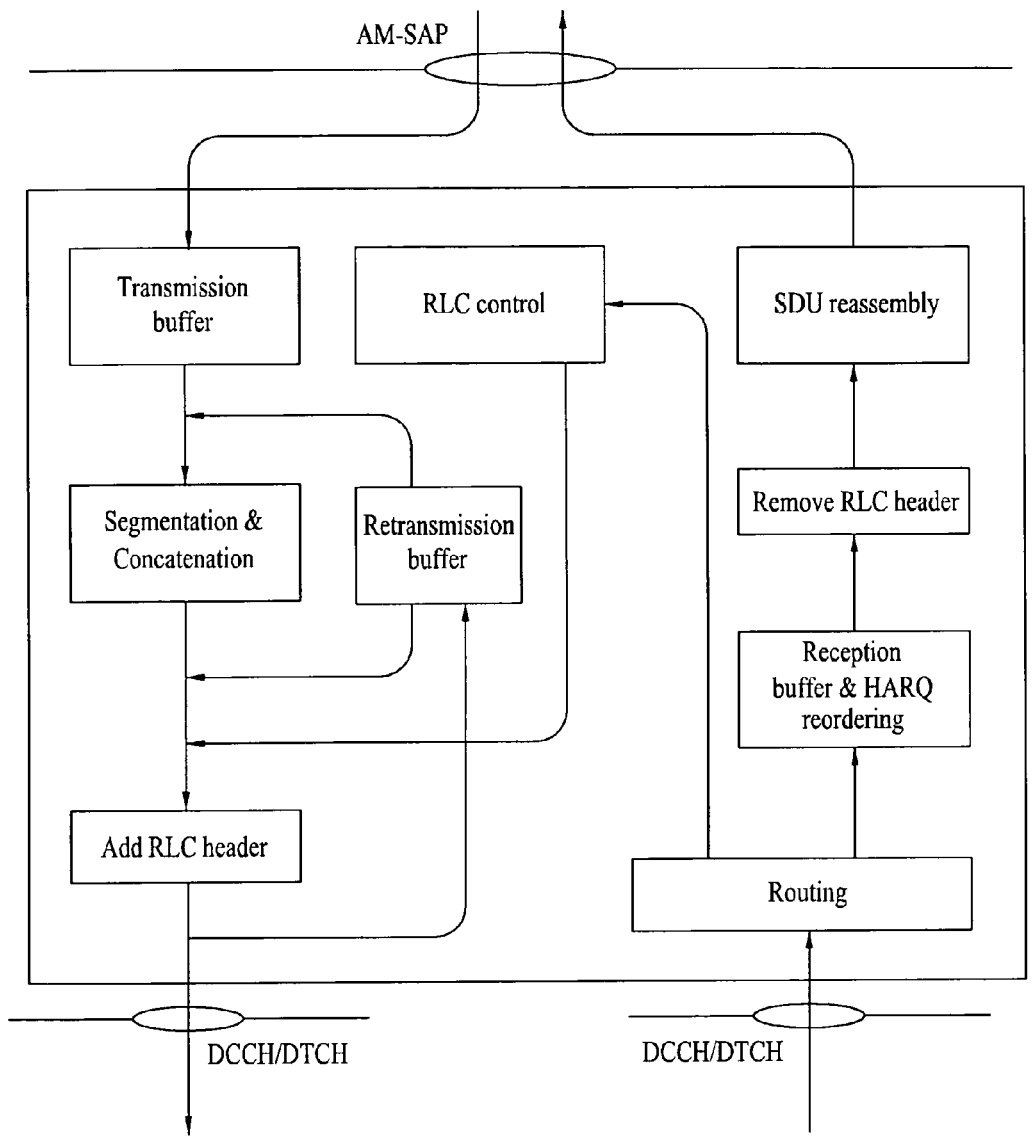
FIG. 9 is a functional block diagram of an Acknowledged Mode RLC (AM RLC) entity in the RLC layer.

FIG. 9 is a functional block diagram of the AM RLC entity in the RLC layer. The blocks illustrated in FIG. 9 are functional blocks, which may be different in real implementation. The transmitting and receiving sides of the AM RLC entity process data as follows.

AM RLC Transmitting Side (i.e. Transmitting Side of AM RLC Entity)

Step 1: The AM RLC transmitting side receives an RLC SDU(s) from the PDCP layer and buffers the RLC SDU(s) The AM RLC transmitting side supports flexible RLC PDU sizes.

Step 2: Upon request of transmission from of the MAC layer every predetermined transmission time, the AM RLC transmitting side segments and/or concatenates as many RLC SDUs as needed according to a requested data size.

Step 3: The AM RLC transmitting side configures an RLC PDU by adding an RLC SN to the segmented and/or concatenated data block.

Step 4: The AM RLC transmitting side buffers the RLC PDU in an RLC PDU buffer, for the case of later retransmission.

AM RLC Receiving Side (Receiving Side of AM RLC Entity)

Step 1: The AM RLC receiving side buffers an Acknowledged Mode Data PDU(s) (AMD PDU(s)) and removes a redundant AMD PDU(s). If the RLC data PDU(s) are out of sequence, the AM RLC receiving side re-orders the AMD PDU(s) in an original order.

Step 2: The AM RLC receiving side detects the loss of an AMD PDU(s) in the lower layers and requests retransmission of the lost AMD PDU(s) to a peer AM RLC entity.

Step 3: The AM RLC receiving side removes an SN(s) from an AMD PDU(s).

Step 4: The AM RLC receiving side re-assembles an RLC SDU(s) with the re-ordered AMD PDU(s) and sequentially transmits the RLC SDU(s) to the upper layer.

Figure 10:
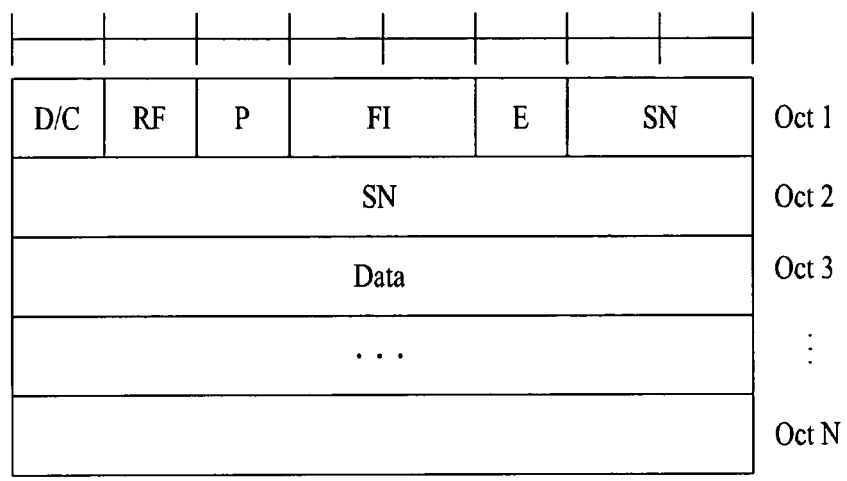
FIG. 10 illustrates a data block format for the AM RLC entity.

FIG. 10 illustrates an exemplary data block format for the AM RLC entity. The data block format is an example and thus many other data block formats are available for the AM RLC entity. An Acknowledged Mode PDU (AMD PDU) is composed of a data field and an AMD PDU header. The AMD PDU header is divided into a fixed part and an extension part. The fixed part is byte-aligned, including a D/C, an RF, a P, an FI, an E, and an SN. The extension part, which is byte-aligned, includes an E (Es) and an LI (LIs).

The AMD PDU header includes the following fields.

D/C (Data/Control): 1 bit. D/C indicates whether the AMD PDU is a data PDU or a control PDU.

RF (Re-segmentation Flag): 1 bit. RF indicates whether the RLC PDU is an AMD PDU or an AMD PDU segment.

P (Polling): 1 bit. P indicates whether a status report has been requested.

FI (Framing Info): 2 bits. FI indicates whether the start and/or end of a data field correspond to the start and/or end of an RLC SDU.

E (Extension): 1 bit. E indicates the presence of a data field or an E/FI field.

SN: 10 bits. SN is a sequence number identifying the AMD PDU.

Figure 11:
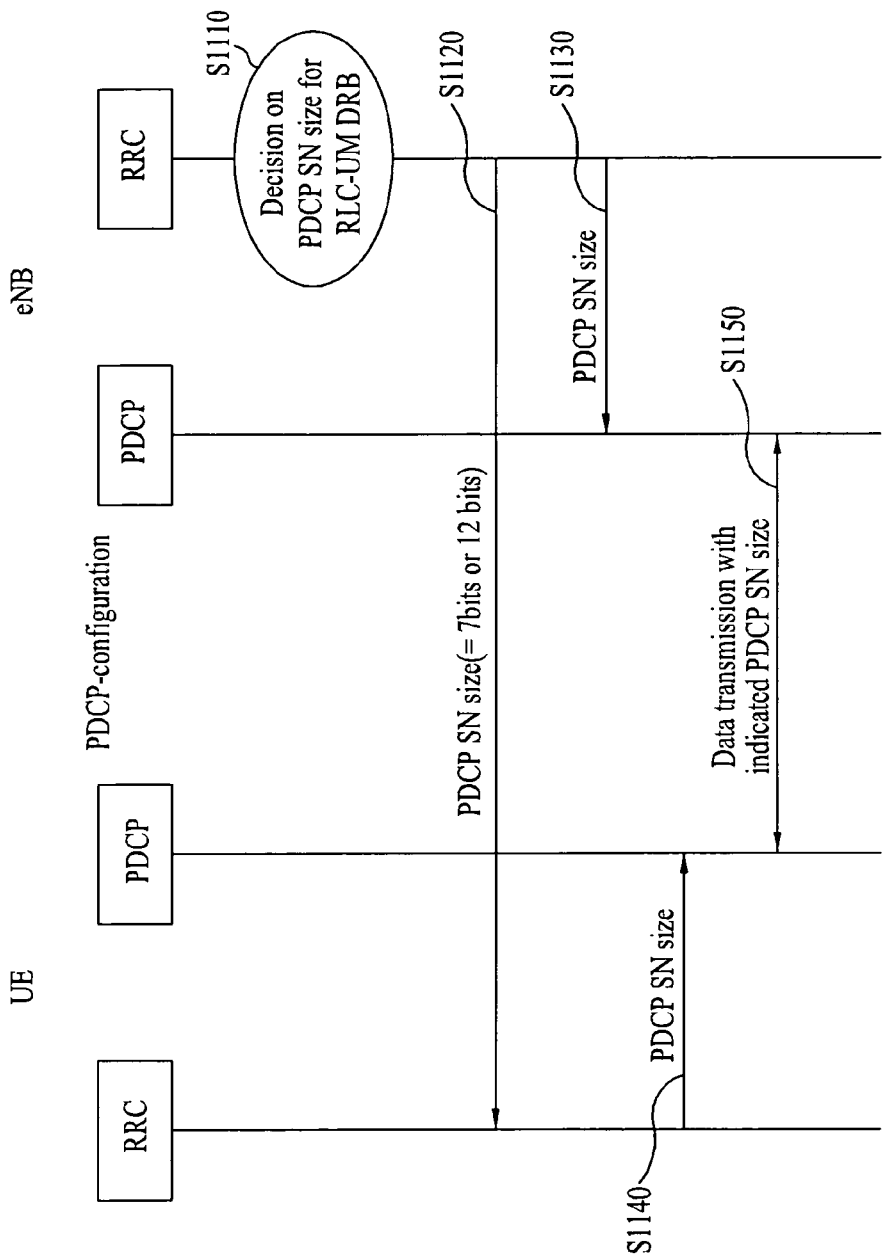
FIG. 11 is a diagram illustrating a conventional signal flow for configuring downlink and uplink data block formats.

FIG. 11 is a diagram illustrating a conventional signal flow for configuring downlink and uplink data block formats. Specifically, FIG. 11 illustrates a procedure for establishing an RLC-UM DRB.

Referring to FIG. 11, the eNB determines the size of a PDCP SN when establishing the DRB in step S1110. Since a 12-bit SN and a 7-bit SN are available to the UM RLC entity, the eNB should make a decision as to whether to use the 12-bit SN or the 7-bit SN. The RRC layer of the eNB takes charge of determining the PDCP SN size. To be more specific, the RRC layer of the eNB selects one of 7 bits or 12 bits as the PDCP SN size. Then the eNB RRC layer notifies the RRC layer of the UE of PDCP configuration information indicating the determined PDCP SN size by an RRC message in step S1120. That is, the PDCP configuration information indicates one of 7 bit or 12 bits as the PDCP SN size. At present, Technical Specification 36.331 of 3GPP Release 8 defines PDCP configuration information delivered by an RRC message as in Table 1 and Table 2.

In steps S1130 and S1140, the UE and the eNB establish PDCP entities with the determined PDCP SN size. A data block format for data transmission is determined based on the PDCP SN size and the UE and the eNB communicate with each other using the data block format in step S1150. For example, the data block format with the PDCP SN size indicated by the RRC layer of the eNB can be the PDCP data PDU illustrated in FIG. 5.

One PDCP entity can be connected to one or more RLC entities according to DRB characteristics, which can also be applied to the case of FIG. 11. In case of a uni-directional DRB, one PDCP entity is connected to a single downlink or uplink UM RLC entity. In case of a bi-directional DRB, one PDCP entity can be connected to one AM RLC entity or two UM RLC entities. Especially when a single PDCP entity is connected to two UM RLC entities, the UM RLC entities take charge of data transmissions in different directions.

TABLE 1

```
-- ASN1START
PDCP-Configuration    ::=    SEQUENCE {
    discardTimer             INTEGER {0}                              OPTIONAL,   -- range FFS
    rlc-Mode                 CHOICE {
        rlc-AM                   SEQUENCE {
            statusReportRequired     BOOLEAN,
            flushTimer               ENUMERATED {ffs}
        },
        rlc-UM                   SEQUENCE {
            pdcp-SN-Size             ENUMERATED {len7bits, len12bits}
        }
    },
    headerCompression        CHOICE {
        notUsed                  NULL,
        rohc                     SEQUENCE {
            maxCID-UL                INTEGER {1..16383}                DEFAULT 15,
            maxCID-DL                INTEGER {1..16383}                DEFAULT 15,
            profiles                 SEQUENCE {SIZE {1..maxROHC-Profile}}   OF SEQUENCE {
                profileInstance          INTEGER {1..65536}
            }
        }
    }
}
-ASN1STOP
```

TABLE 2

PDCP-Configuration field descriptions pdcp-SN-Size

Indicates the length of the PDCP Sequence Number as specified.

maxCID-UL

Highest context ID number to be used in the uplink by the UE compressor.

TABLE 2-continued

PDCP-Configuration field descriptions maxCID-DL

Highest context ID number that can be used in the downlink by the eNB compressor.

profiles

Profiles used by both compressor and decompressor in both UE and UTRAN. Profile 0 shall always be supported and may always be used even if it is not listed.

profileInstance

Index to a ROHC profile as specified. If 2 profiles with the same 8 LSB's are signalled, only the profile corresponding to the highest value should be applied.

Conventionally, when a bi-directional RLC-UM DRB is established, the PDCP entity uses one data block format irrespective of the downlink or the uplink. That is, the transmitting and receiving sides of the PDCP entity use the same PDCP SN size on the bi-directional DRB.

However, the bi-directional DRB may have different characteristics on the downlink and the uplink. For instance, a service such as multimedia streaming download is characterized by a large amount of downlink data and a small amount of uplink data like feedback information. For this bi-directional DRB having asymmetrical traffics, it is not efficient to use the same data block format (i.e. the same PDCP SN size) for the downlink and the uplink.

In this context, the present invention provides a method for efficiently using radio resources, taking into account the traffic characteristics of a DRB. Specifically, different downlink and uplink data block formats are configured for a specific protocol layer having a transmitting side and a receiving side in one entity, taking into account the traffic characteristics of a DRB in accordance with the present invention.

Figure 12:
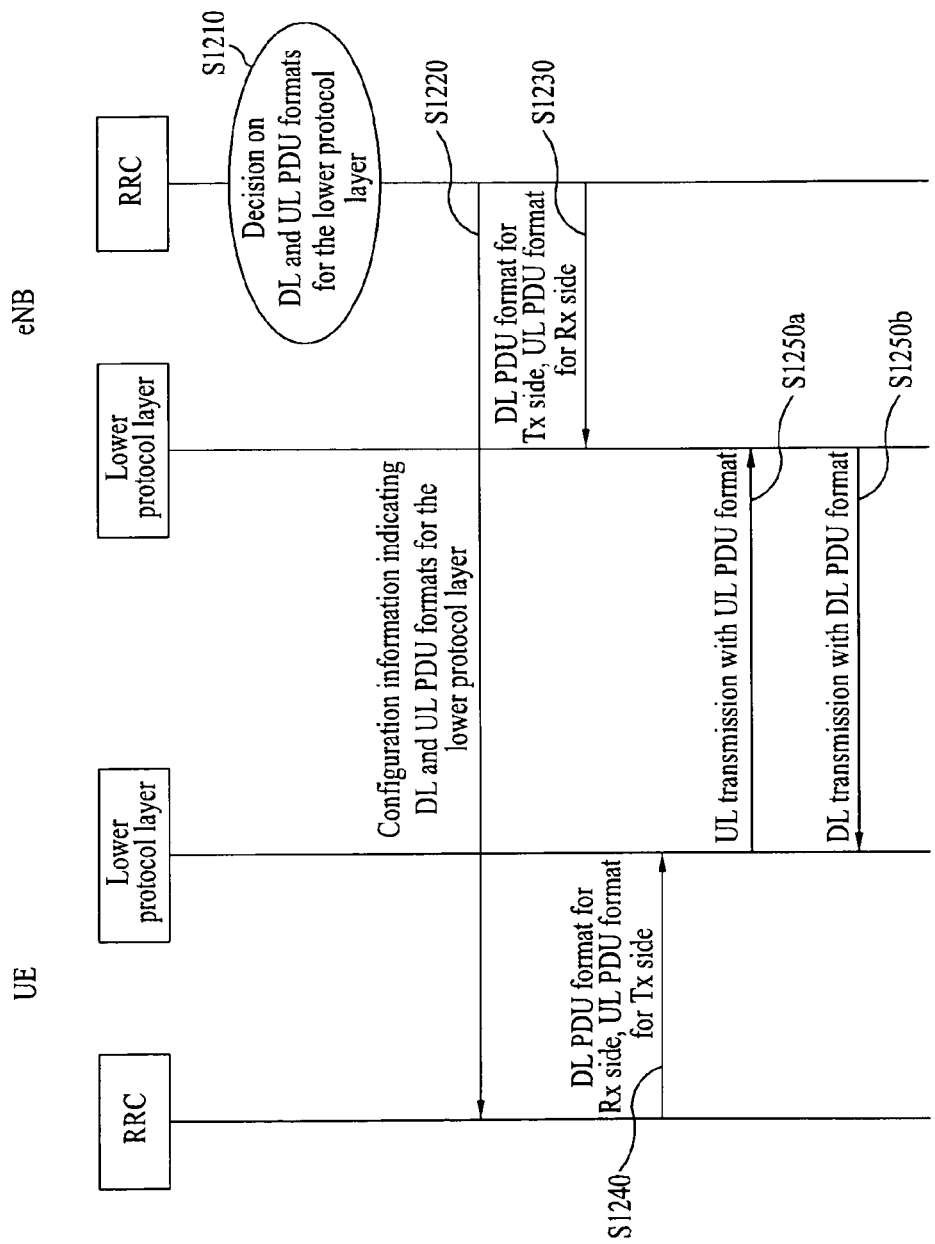
FIGS. 12, 13 and 14 are diagrams illustrating signal flows for configuring downlink and uplink data block formats according to exemplary embodiments of the present invention.

FIG. 12 is a diagram illustrating a signal flow for configuring downlink and uplink data block formats for a specific protocol layer according to an exemplary embodiment of the present invention.

Referring to FIG. 12, the RRC layer of the eNB determines downlink and uplink data formats separately for a lower-layer protocol entity in step S1210. The lower-layer protocol entity of interest is confined to a protocol entity including both a transmitting side and a receiving side in the present invention. This protocol entity can be a PDCP entity or an AM RLC entity. For a protocol entity that serves only as one of a transmitting entity and a receiving entity, a transmitting protocol entity and a receiving protocol entity are individually configured according to a DRB since they are separate protocol entities.

To ensure configuring of different downlink and uplink data block formats, the protocol entity having both a transmitting side and a receiving side should be able to use at least two different data block formats. These two or more different block formats can be designed in many manners, taking into account traffic characteristics. Preferably, the data block formats can be designed in various ways by adjusting the size of an SN included in a header according to traffic characteristics. In this case, many SNs can be considered depending on traffic characteristics and as many data block formats as SN types are available. When an SN size changes for a data block format, other elements (fields) in the data block format may also change. For example, new elements can be added or existing elements may be modified in length or number in the data block format. For instance, if the size of an SN included in the header of a data block format is changed, one or more R bits can be added to a header size for byte-alignment.

The present 3GPP LTE system has already defined two types of data block formats for a user-plane PDCP entity (i.e. data block formats having a 7-bit SN and a 12-bit SN, respectively). In order to facilitate system implementation and enhance compatibility with the 3GPP LTE system, the present invention can still use the data block format with a 7-bit SN or a 12-bit SN as defined for the PDCP entity. However, considering service diversity brought by the development of communication technology and multimedia technology, various data block formats can be contemplated adaptively to the traffic characteristics of each service. That is, regarding the PDCP entity, the data block format with a 7-bit SN or a 12-bit SN is an exemplary application and more data block formats can be used separately for the downlink and the uplink in the present invention. Specifically, data block formats can be designed to support various SN sizes for the PDCP entity in the present invention.

The 3GPP LTE system defines a data block format with a 10-bit SN for the AM RLC entity. Accordingly, there is a need for additionally designing a data block format for the AM RLC entity to implement the present invention. To be more specific, a data block format with an SN of any other size different from 10 bits can be additionally configured.

Meanwhile, dynamic setting of an SN size in a data block format may lead to accurate reflection of various traffic characteristics in one respect but it means the existence of a very large number of data block formats in another respect. The existence of multiple data blocks may impose a constraint on the communication system. Therefore, it is preferred that a limited number of or fewer data block formats are designed. For example, two types of data block formats suffice for efficient use of radio resources in the present invention.

On the premise that a plurality of data block formats are available to a protocol entity having both a transmitting side and a receiving side, downlink and uplink data block formats can be configured independently for the protocol entity. That is, the configuration of a data block format for one transmission direction does not affect that of a data block format for the other transmission direction. A decision as to the configuration of a data block format may involve traffic characteristics including data rate, data amount, etc., to which the data block format decision is not limited. For instance, if the downlink and uplink traffic characteristics of a DRB are similar, the same data block format can be configured for the downlink and the uplink. Also, if the downlink and uplink of the DRB are asymmetrical in traffic characteristics, the downlink and uplink data block formats can be different. In another instance, if the DRB has similar traffic characteristics for the downlink and the uplink, the downlink and uplink data block formats may have the same SN size in their headers. Also, in case of asymmetrical traffic characteristics, a data block format for the downlink or the uplink requiring transmission of a large amount of data can be configured to include a relatively long SN, compared to a data block for the other uplink or downlink.

The PDCP entity and the AM RLC entity have been described above as protocol entities each having both a transmitting side and a receiving side. Hence, the RRC layer of the eNB can determine downlink and uplink data block formats separately for the PDCP entity and/or the AM RLC entity. To relive system constraints, preferably, the downlink and uplink data block formats are separately determined only for one of the PDCP entity and the AM RLC entity.

After determining the downlink and uplink data block formats, the eNB transmits configuration information about the specific protocol entity for the DRB to the RRC layer of the UE by an RRC message in step S1220. The specific protocol entity can be the PDCP entity and/or the AM RLC entity. The protocol entity configuration information includes information indicating the downlink and uplink data block formats. The downlink and uplink data block formats can be indicated in various manners depending on implementations. For example, the eNB can include, in the configuration information, information indicating the data block formats themselves, information indicating the sizes of SNs included in the headers of the data block formats, an index indicating a combination of the downlink and uplink data block formats, or an index indicating a combination the sizes of the SNs used for the downlink and uplink data block formats.

Also, the eNB can use a specific 1-bit indicator indicating whether the downlink and uplink data block formats are identical. If the indicator indicates that the downlink and uplink data block formats are identical, the eNB can still use a conventional format for the protocol entity configuration information. If the indicator indicates that the downlink and uplink data block formats are different, the eNB can include both downlink data block format information and uplink data block format information in the configuration information. Especially if only two types of data block formats are defined, the indicator may further indicate a combination of the downlink and uplink data block formats in addition to the information indicating whether the downlink and uplink data block formats are identical or not, under the assumption that the amount of downlink traffic is generally more than that of uplink traffic when downlink and uplink traffics are asymmetric. For description, it is assumed that data block format A with a 7-bit SN and data block format B with a 12-bit SN are defined. In this case, if the indicator indicates that the downlink and uplink data block formats are different, it can further indicate the combination of data block A for the uplink and data block B for the downlink. That is possible because the downlink generally carries more data than the uplink. For this reason, a data block format with a relatively long SN can be used for downlink transmission and thus only one combination of UL/DL data block formats is actually allowed for asymmetric traffics.

In steps S1230 and S1240, the RRC layers of the UE and the eNB command their lower layers to configure the downlink and uplink data block formats separately. Accordingly, the lower layers configure the downlink and uplink data block formats for the transmitting and receiving sides of the protocol entities. Each of the lower-layer protocol entities can be a PDCP entity or an AM RLC entity.

Upon completion of the RB setup including configuring of the downlink and uplink data block formats, the UE transmits data to the eNB in the configured uplink data block format in step S1250a and receives data from the eNB in the configured downlink data block format in step S1250b.

Figure 13:
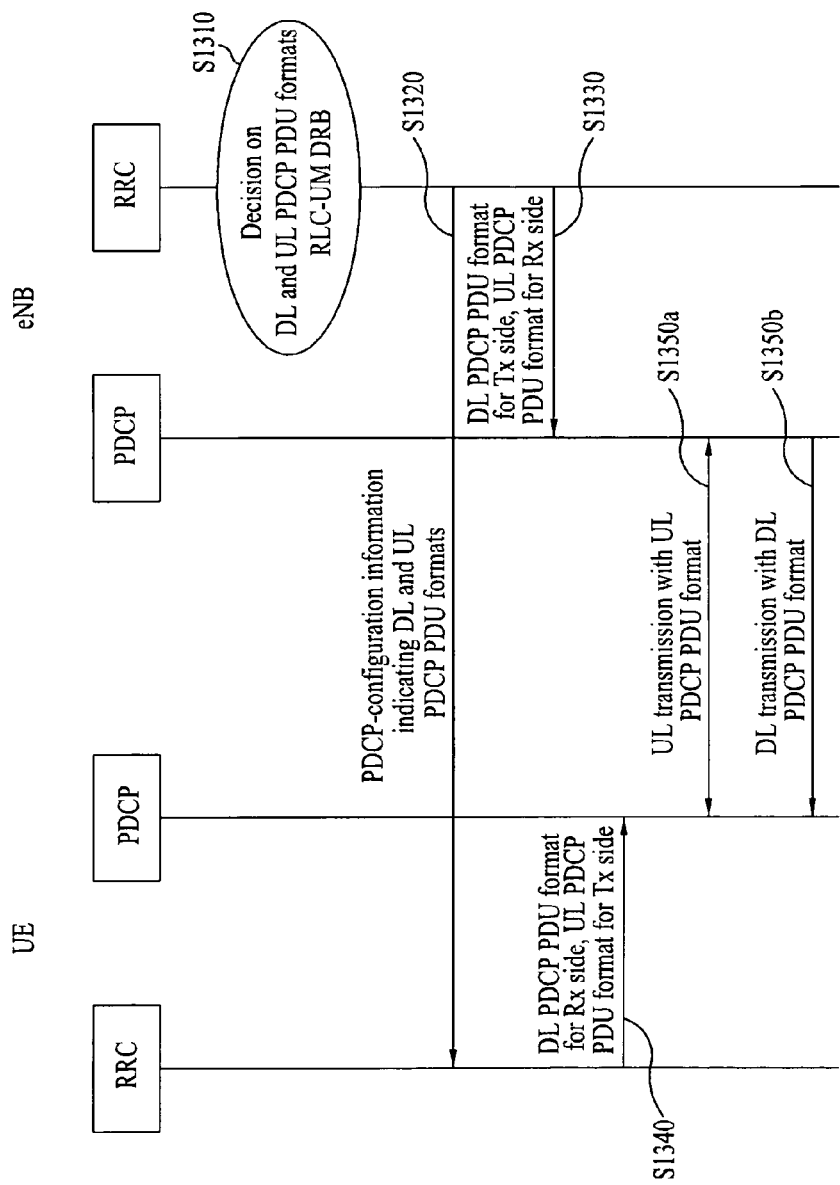

FIG. 13 is a diagram illustrating a signal flow for configuring downlink and uplink data block formats for a specific protocol layer according to another exemplary embodiment of the present invention. This exemplary embodiment of the present invention is basically identical to that illustrated in FIG. 12, except that the PDCP entity is taken as a protocol entity having both a transmitting side and a receiving side.

Referring to FIG. 13, when a DRB to be set up uses RLC UM, the RRC layer of the eNB determines PDCP PDU formats suitable for downlink transmission and uplink transmission, separately according to traffic characteristics in step S1310. The RRC layer of the eNB transmits PDCP entity configuration information for the DRB to the RRC layer of the UE by an RRC message (e.g. a PDCP-configuration message). The RRC layer of the eNB notifies data block formats for the transmitting and receiving sides of the PDCP entity, that is, downlink and uplink data block formats for the PDCP entity through the PDCP entity configuration information in step S1320. Simultaneously with the transmission of the PDCP entity configuration information, the RRC layer of the eNB configures an eNB PDCP entity according to the PDCP entity configuration information in step S1330. The eNB configures the PDCP entity such that its transmitting side uses the downlink data block format and its receiving side uses the uplink data block format. Similarly, the RRC layer of the UE configures a UE PDCP entity according to the received PDCP entity configuration information in step S1340. The UE configures the PDCP entity such that its transmitting side uses the uplink data block format and its receiving side uses the downlink data block format. Upon completion of the RB setup including configuring of the downlink and uplink PDCP PDU formats, the UE transmits data to the eNB in the configured uplink PDCP PDU format in step S1350a and receives data from the eNB in the configured downlink PDCP PDU format in step S1350b.

If the DRB described in FIG. 13 is uni-directional, a PDCP data block format can be configured only for one of the downlink and the uplink according to the data transmission direction of the DRB. That is, the RRC layer of the eNB determines a PDCP data block format only for one of the downlink and the uplink and notifies the UE of the determined PDCP data block format by an RRC message (e.g. a PDCP-configuration message). After receiving the RRC message, the RRC layer of the UE configures a PDCP entity only for the direction indicated by the RRC message.

Because the number of separate data block formats to be indicated is depending on whether a DRB is uni-directional or bi-directional as stated above, data block formats can be indicated for DRBs as follows.

Bi-directional DRB: {DL PDCP data block format, UL PDCP data block format}
    Downlink uni-directional DRB: {DL PDCP data block format}
    Uplink uni-directional DRB: {UL PDCP data block format}

The RRC layer of the eNB can indicate data block formats to the RRC layer of the UE in many ways depending on implementations, as illustrated in FIG. 12.

Figure 14:
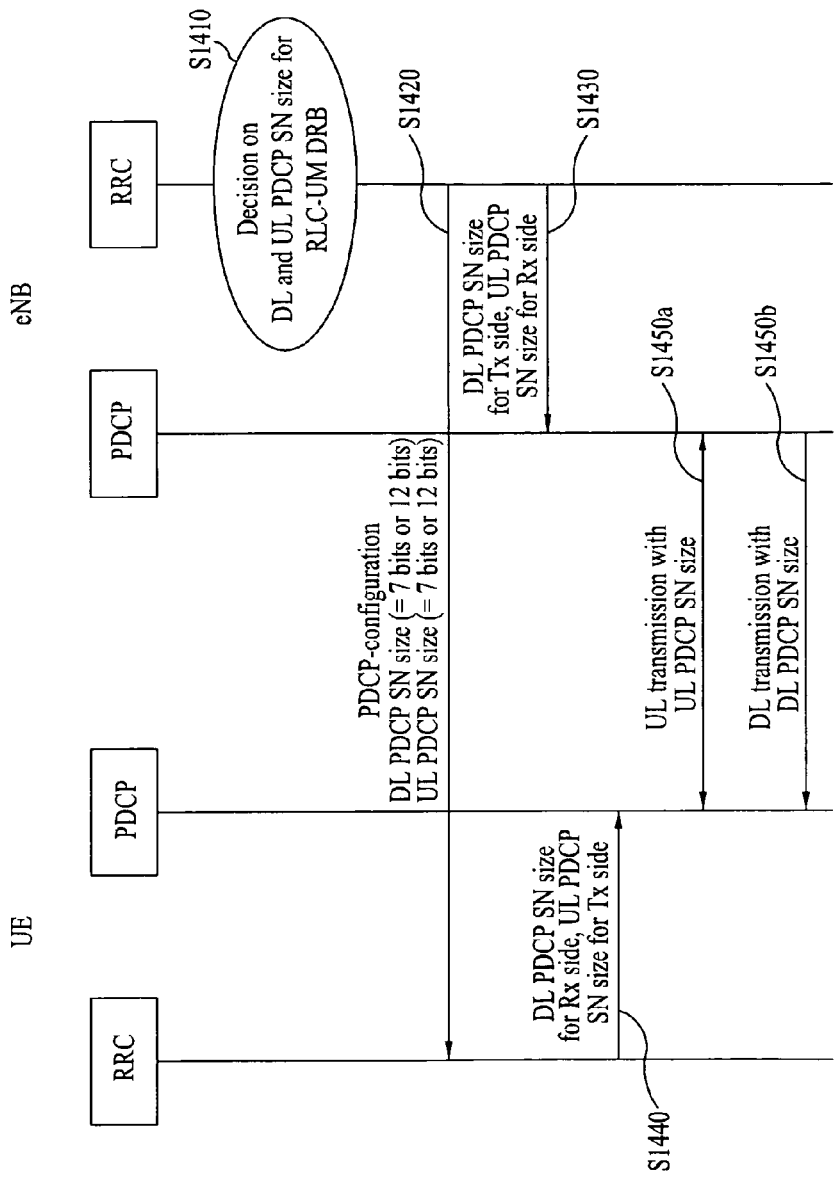

FIG. 14 is a diagram illustrating a signal flow for configuring downlink and uplink data block formats for a specific protocol layer according to a further exemplary embodiment of the present invention. This exemplary embodiment of the present invention is basically identical to that illustrated in FIG. 12, except that the PDCP entity is taken as a protocol entity having both a transmitting side and a receiving side.

Referring to FIG. 14, when a DRB to be set up uses RLC UM, the RRC layer of the eNB determines PDCP SN sizes suitable for downlink transmission and uplink transmission, separately according to traffic characteristics in step S1410. The RRC layer of the eNB transmits PDCP entity configuration information for the DRB to the RRC layer of the UE by an RRC message (e.g. a PDCP-configuration message). The RRC layer of the eNB notifies SN sizes for the transmitting and receiving sides of the PDCP entity, that is, SN sizes for downlink and uplink transmissions for the PDCP entity through the PDCP entity configuration information in step S1420. While not limited to Table 3, step S1420 can be performed by modifying PDCP configuration information as defined in Technical Specification 36.331 of 3GPP Release 8 to Table 3.

TABLE 3

```
-- ASN1START
PDCP-Configuration ::=      SEQUENCE {
  discardTimer              INTEGER {0}                        OPTIONAL, -- range FFS
  rlc-Mode                  CHOICE {
    rlc-AM                  SEQUENCE {
      statusReportRequired  BOOLEAN,
      flushTimer            ENUMERATED {ffs}
    },
    rlc-UM                  SEQUENCE {
      pdcp-UL-SN-Size            ENUMERATED {len7bits, len12bits}
      pdcp-DL-SN-Size            ENUMERATED {len7bits, len12bits}
    }
```

TABLE 3-continued

```
  },
  headerCompression          CHOICE {
    notUsed                    NULL,
    rohc                       SEQUENCE {
      maxCID-UL                  INTEGER {1..16383}                      DEFAULT 15,
      maxCID-DL                  INTEGER {1..16383}                      DEFAULT 15,
      profiles                   SEQUENCE {SIZE {1..maxROHC-Profile}}    OF SEQUENCE {
        profileInstance            INTEGER {1..65536}
      }
    }
  }
}
}
-ASN1STOP
```

As noted from Table 3, downlink and uplink PDCP data block formats can be indicated separately to the UE by use of pdcp-UL-SN-size and pdcp-DL-SN-size.

In step S1430, the RRC layer of the eNB configures an eNB PDCP entity according to the PDCP entity configuration information, simultaneously with the transmission of PDCP entity configuration information. The eNB configures the PDCP entity such that its transmitting side uses the downlink PDCP SN size and its receiving side uses the uplink PDCP SN size. Similarly, the RRC layer of the UE configures a UE PDCP entity according to the received PDCP entity configuration information in step S1440. The UE configures the PDCP entity such that its transmitting side uses the uplink PDCP SN size and its receiving side uses the downlink PDCP SN size. Upon completion of the RB setup including determining the downlink and uplink PDCP PDU SN sizes, the UE transmits data to the eNB using the uplink PDCP SN size in step S1450a and receives data from the eNB using the downlink PDCP SN size in step S1450b If the DRB described in FIG. 14 is uni-directional, a PDCP SN size can be set only for one of the downlink and the uplink according to the data transmission direction of the DRB. That is, the RRC layer of the eNB determines a PDCP SN size only for one of the downlink and the uplink and notifies the UE of the determined PDCP SN size by an RRC message (e.g. a PDCP-configuration message). After receiving the RRC message, the RRC layer of the UE configures a PDCP entity only for the direction indicated by the RRC message.

Because the number of separate PDCP SN sizes to be indicated is depending on whether a DRB is uni-directional or bi-directional, PDCP SN sizes can be indicated for DRBs as follows.

Bi-directional DRB: {DL PDCP SN size, UL PDCP SN size}
Downlink uni-directional DRB: {DL PDCP SN size}
Uplink uni-directional DRB: {UL PDCP SN size}

The RRC layer of the eNB can indicate PDCP SN sizes to the RRC layer of the UE in many ways depending on implementations, as illustrated in FIG. 12.

While FIGS. 13 and 14 describe how data block formats are configured specifically in the context of the PDCP entity, the same or similar procedures may apply to the AM RLC entity. Thus, FIGS. 13 and 14 are referred to for a procedure for configuring data block formats for the AM RLC entity.

As is apparent from the above description, the present invention has the following effects.

(1) Radio resources can be used efficiently when downlink and uplink traffic characteristics are different in a mobile communication system.

(2) Radio resources can be used efficiently by using different downlink and uplink data block formats according to traffic characteristics.

(3) Radio resources can be used efficiently by using SNs of different sizes according to traffic characteristics.

The present invention is applicable to a mobile communication system, particularly to a method for establishing an RB in a mobile communication system. Also, the present invention can be applied to a method for conducting communications using data block formats.

The exemplary embodiments described hereinabove are combinations of elements and features of the present invention. The elements or features may be considered selective unless otherwise mentioned. Each element or feature may be practiced without being combined with other elements or features. Further, the embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

In exemplary embodiments of the present invention, a description is mainly made of a data transmission and reception relationship between a Node B and a user equipment. Here, a specific operation described as being performed by the Node B may be performed by an upper node of the Node B. Namely, it is apparent that, in a network comprised of a plurality of network nodes including a Node B, various operations performed for communication with the user equipment may be performed by the Node B, or network nodes other than the Node B. The term 'Node B' may be replaced with a fixed station, a base station, an eNode B (eNB), an access point, etc. The term 'user equipment' may be replaced with a mobile terminal, a mobile station (MS), a mobile subscriber station (MSS), etc.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for establishing a radio bearer in a User Equipment (UE) in a mobile communication system, the method comprising:
    receiving configuration information about a specific protocol layer, wherein the configuration information includes a common sequence number (SN) size for a downlink data block format and a uplink data block format and a 1-bit indicator,
    wherein the 1-bit indicator indicates whether a SN size for the downlink data format and a SN size for the uplink data format are identical or different,
    when the SN size for the downlink data format and the SN size for the uplink data format are identical, the downlink data format and the uplink data format use the common SN size,
    when the SN size for the downlink data format and the sequence number size for the uplink data format are different, the 1-bit indicates further indicates a combination of downlink data block format having a 12-bit Sequence Number (SN) and the uplink data block format having a 7-bit SN; and
    configuring the downlink data block format and the uplink data block format separately for an entity of the specific protocol layer according to the received configuration information,
    wherein the entity of the specific protocol layer has both a transmitting side and a receiving side.

2. The method according to claim 1, further comprising:
    transmitting and receiving data using the downlink and uplink data block formats configured for the entity of the specific protocol layer.

3. The method according to claim 1, wherein the entity of the specific protocol layer having both the transmitting side and the receiving side includes at least one of a Packet data Convergence Protocol (PDCP) entity and an Acknowledged Mode Radio Link Control (AM RLC) entity.

4. The method according to claim 1, wherein the configuration information is about a bi-directional Data Radio bearer (DRB).

5. The method according to claim 4, wherein the bi-directional DRB has different downlink and uplink traffic characteristics.

6. The method according to claim 5, wherein the bi-directional DRB uses a downlink Unacknowledged Mode Radio Link Control (UM RLC) entity and an uplink UM RLC entity, and the downlink UM RLC entity and the uplink UM RLC entity use different UM RLC data block formats.

7. The method according to claim 6, wherein the entity of the specific protocol layer is a PDCP entity and the downlink and uplink PDCP data block formats are different for the PDCP entity.

* * * * *